United States Patent [19]

Battiste et al.

[11] Patent Number: 4,719,191

[45] Date of Patent: Jan. 12, 1988

[54] PILLARED INTERLAYERED CLAY PRODUCTS OF INCREASED STABILITY

[75] Inventors: David R. Battiste; Jesse R. Harris; George D. Parks; Brent J. Bertus, all of Bartlesville, Okla.

[73] Assignee: Phillips Petroleum Company, Bartlesville, Okla.

[21] Appl. No.: 908,276

[22] Filed: Sep. 17, 1986

[51] Int. Cl.$^4$ .............................................. B01J 21/16
[52] U.S. Cl. .......................................... 502/84; 502/63
[58] Field of Search ................................. 502/84, 63

[56] References Cited

U.S. PATENT DOCUMENTS

| | | | |
|---|---|---|---|
| 4,176,090 | 11/1979 | Vaughan et al. | 252/455 Z |
| 4,248,739 | 2/1981 | Vaughan et al. | 502/84 |
| 4,271,043 | 6/1981 | Vaughan et al. | 252/455 R |
| 4,367,163 | 1/1983 | Pinnavaia et al. | 252/455 R |
| 4,452,910 | 6/1984 | Hopkins et al. | 502/84 |
| 4,515,901 | 5/1985 | Elattar | 502/84 |
| 4,629,713 | 12/1986 | Suzuki et al. | 502/84 |
| 4,637,991 | 1/1987 | Battiste et al. | 502/84 |

*Primary Examiner*—Carl F. Dees
*Attorney, Agent, or Firm*—Laney, Dougherty, Hessin & Beavers

[57] ABSTRACT

Pillared interlayered clay products of increased stability and processes for preparing such clay products are provided. The pillared interlayered clays are prepared by reacting a smectite clay, such as montmorillonite, with an aqueous solution of a polymeric cationic hydroxy metal complex, such as aluminum chlorhydroxide and reacting the resulting product with a stability increasing compound selected from the group consisting of silicon, titanium, phosphorus and antimony halides and ethyl silicates.

16 Claims, No Drawings

PILLARED INTERLAYERED CLAY PRODUCTS OF INCREASED STABILITY

BACKGROUND OF THE INVENTION

1. Field of the Invention

The present invention relates to the preparation of an improved pillared interlayered clay product, and more specifically, to a pillared interlayered clay product having increased stability at high temperatures and in the presence of steam.

2. Background of the Invention

Processes for preparing pillared interlayered clay products have been developed and used heretofore. The pillared interlayered clays produced have useful catalytic and adsorbent properties.

U.S. Pat. No. 4,176,090 issued Nov. 27, 1979 discloses a pillared interlayered clay product and method of preparing such product wherein a smectite clay is reacted with an aqueous solution of a polymeric cationic hydroxy metal complex, or a mixture of such complexes. The resulting pillared clay product is separated from the reaction mixture, calcined at a temperature in the range of from about 200° C. to about 700° C. and then cooled, washed and dried.

Such pillared interlayered clay products have shown promise as catalyst supports and catalysts for petroleum hydrocracking and FCC processes for producing petroleum products. However, a major problelm encountered in such uses of pillared interlayered clays heretofore produced is their instability at high temperatures and/or in the presence of steam. That is, the pillared interlayered clays heretofore prepared from smectites tend to collapse when subjected to high temperatures and/or when subjected to steam contact whereby all or major portions of the surface areas of the clays are lost.

Thus, there is a need for pillared interlayered clay products which have increased stabilities at high temperatures and/or in the presence of steam.

SUMMARY OF THE INVENTION

Pillared interlayered clay products of increased stability at high temperatures and in the presence of steam are provided as are processes of preparing such products. The processes are basically comprised of the steps of reacting a smectite clay with an aqueous solution of a polymeric cationic hydroxy metal complex, separating the resulting pillared clay product from the reaction mixture, calcining the product at a temperature in the range of from about 300° C. to about 800° C., cooling the product, reacting the product with a stability increasing compound selected from the group consisting of silicon, titanium, phosphorus and antimony halides and ethyl silicates at a temperature in the range of from about 23° C. to about 500° C. and again calcining the resulting pillared interlayered clay product at a temperature in the range of from about 300° C. to about 800° C.

It is, therefore, a general object of the present invention to provide pillared interlayered clay products having increased thermal and hydrothermal stability.

A further object of the present invention is the provision of a pillared interlayered clay suitable for use as catalyst support and/or catalyst for petroleum hydrocracking and FCC processes having improved resistance to decomposition and collapse.

Other and further objects, features and advantages of the present invention will be readily apparent to those skilled in the art upon a reading of the description of preferred embodiments which follows.

DESCRIPTION OF PREFERRED EMBODIMENTS

Layered naturally occurring smectites such as montmorillonites, bentonites, and chlorites are comprised of platelets stacked one upon the other. Each platelet includes an inner layer of alumina surrounded by outer layers of silica. When such smectite clays are reacted with an aqueous solution of a polymeric cationic hydroxy metal complex, the platelets forming the clays are expanded and interlayers of the metal complex are formed between the expanded clay layers. Upon calcination, the metal complex decomposes to form metal oxide "pillars" between the clay platelets. The resulting pillared interlayered clay products posses a unique interconnected internal micropore structure. In accordance with the present invention pillared interlayered clay products having improved thermal and hydrothermal stability are produced by treating the calcined clay-metal complex reaction product with a stability increasing compound where-by the resulting product has improved resistance to thermal or hydrothermal decomposition and collapse.

The polymeric cationic hydroxy metal complexes which are useful in producing pillared interlayered clay products are described in U.S. Pat. No. 4,176,090 issued Nov. 27, 1979, which is incorporated herein by reference. Preferred such complexes are those wherein the metal is aluminum or zirconium. A particularly preferred such complex is an aluminum chlorhydroxide polymer marketed under the tradename "Chlorhydrol" by Reheis Chemical Company, a division of Armour Pharmaceutical Company of Phoenix, Ariz.

The process of the present invention for preparing a pillared interlayered clay product of increased stability at high temperatures, i.e., temperatures above about 500° C., and in the presence of steam is as follows. A smectite clay, preferably bentonite or montmorillonite, is reacted with an aqueous solution of a polymeric cationic hydroxy metal complex, or a mixture of such complexes. The pillared clay reaction product which results is separated from the reaction mixture and calcined at a temperature in the range of from about 300° C. to about 800° C. The product is then cooled to a temperature in the range of from about 23° C. to about 300° C., preferably room temperature, and reacted with a stability increasing compound at a temperature in the range of from about 23° C. to about 500° C. The resulting stabilized pillared clay product is again calcined at a temperature in the range of from about 300° C. to about 800° C.

The stability increasing compounds which are useful in accordance with this invention are compounds or mixtures of compounds selected from the group consisting of silicon, titanium, phosphorus and antimony halides and ethyl silicates. Examples of such compounds are silicon, titanium, phosphorus, and antimony chlorides, bromides, fluorides and iodides, ethyl silicate and hydrolyzed ethyl silicate. The most preferred stability increasing compound is silicon tetrachloride.

It is believed the stability increasing compounds react with alumina forming the pillars between the clay platelets, alumina in defect sites in the silica layers of the platelets, and/or with iron oxide impurities in the silica layers wherein the aluminum and/or iron cations are replaced by silicon, titanium, phosphorus and/or antimony cations.

The procedure followed and the conditions under which the reaction of the stability increasing compound and pillared clay is carried out affect the physical properties of the resulting stabilized pillared clay product. Preferably, the reaction is carried out by cooling the initially prepared calcined pillared clay reaction product to a temperature in the range of from about 23° C. to about 500° C., most preferably a temperature of about 23° C. The cooled pillared clay is then contacted with the stability increasing compound or compounds, either directly or by means of an inert gas carrier such as helium, for a time period in the range of from about 5 minutes to about 20 minutes whereby the stability increasing compound or compounds are adsorbed on the pillared clay to substantial saturation. The pillared clay with adsorbed stabilizing compound is then heated to a temperature in the range of from about 300° C. to about 500° C., preferably about 457° C., over a time period in the range of from about 20 minutes to about 150 minutes while continuing contact with the stability increasing compound. The resulting pillared clay reaction product is calcined, i.e., heated in the presence of air to a temperature in the range of from about 300° C. to about 800° C., preferably 457° C., for a time period in the range of from about 20 minutes to about 60 minutes. After calcination, the product is cooled to room temperature, washed with water and dried at 100° C.

As mentioned above, the pillared interlayered clay products of increased stability of this invention are particularly useful in the preparation of catalysts such as petroleum conversion catalysts, e.g., hydrocracking catalysts, isomerization catalysts, reforming catalysts, alkylation catalysts, etc.

In order to further illustrate the processes and pillared clay products of this invention and to facilitate a clear understanding thereof, the following example is given.

EXAMPLE

A pillared interlayered bentonite clay product is initially prepared by reacting 300 grams of bentonite with 150 milliliters of a 50 weight percent aqueous solution of aluminum chlorhydroxide (Chlorhydrol). The reaction is carried out at a temperature of 60° C. for a time period of 2 hours. The pillared clay reaction product which results is separated from the reaction mixture and separated into two parts, one of which is calcined in air at a temperature of about 500° C. for about two hours.

First portions of the initially prepared calcined and noncalcined pillared clays (designated hereinafter as "Procedure I" clays) are each cooled to room temperature and contacted with an inert gas (helium)-silicon tetrachloride mixture for 20 minutes whereby silicon chloride is adsorbed thereon to substantial saturation. The resultant silicon tetrachloride saturated pillared clay is heated to a temperature of about 457° C. while continuing to contact the clay with the helium-silicon tetrachloride mixture for an additional 20 minutes. The resulting reaction product is calcined by heating at a temperature of about 457° C. in air for 20 minutes. The calcined product is then cooled to room temperature, washed with water and dried at 100° C.

Second portions of the initially prepared calcined and noncalcined pillared clays (designated hereinafter as "Procedure II" clays) are not cooled to room temperature prior to contact with the helium-silicon tetrachloride gas mixtures. That is, the second portions are each contacted with silicon tetrachloride gas at a begining temperature of 370° C. During the contact the second portions are each heated to 460° C. over a time period of about 20 minutes. The resulting reaction products are then calcined by heating in air at a temperature of about 460° C. for about 30 minutes followed by cooling to room temperature, washing and drying.

The surface areas of samples of the Procedure I and Procedure II clays treated as described above are determined before and after the samples are subjected to contact with 1 atm. steam at 732° C. for 4 hours. The surface area measurements are made by B-E-T method.

Samples of the Procedure I and Procedure II clays are also subjected to cumene cracking trests to determine the rate constants therefor in accordance with the method of J. N. Miale, N.Y. Chen, and P. B. Weisz, 6 *Journal of Catalysis*, pp. 278-287 (1966). The procedure followed in carrying out the tests is as follows.

A known volume of catalyst is loaded in a tubular quartz reactor and heated to 500° C. in air for 1½ hours. A helium stream, saturated with cumene at 75° F., is then passed over the catalyst for 5 minutes. After 5 minutes, the exit stream is sampled by GLC.

The contact time, L, is adjusted by varying the carrier gas flow, F, or the volume of catalyst, V, to keep conversion less than about 5%. The mole percent converation of cumene from the GLC sample is then substituted in the following first order rate equation to give the cumene cracking rate constant (k).

$$k = \frac{1}{L} \ln \frac{1}{1 - \text{mole \% conversion}}$$

where $$L = \frac{(V)(60)}{F}$$

The results of these tests are set forth and compared to untreated samples of the initially prepared pillared clay in Table I below.

TABLE I

| Description of Pillared Clay Tested | Surface Area, m²/gram | Surface Area After Steam Contact, m²/gram | Cumene Cracking Rate Constant (k), sec⁻¹ |
|---|---|---|---|
| Initially Prepared Clay (non-calcined) | 239 | 17 | 0.126 |
| Procedure II Clay (calcined) | 144 | 12 | 0.155 |
| Procedure I Clay (calcined) | 243 | 93 | 1.389 |
| Procedure II Clay (non-calcined) | 138 | 10 | 0.150 |
| Procedure I Clay (non-calcined) | 233 | 54 | 0.282 |

From the above it can be seen that the stabilized pillared interlayered clays of the present invention (Procedure I clays) retain the most surface area after steam contact and are the most active as catalysts.

What is claimed is:

1. In a process of preparing a pillared interlayered clay product wherein a smectite clay is reacted with an aqueous solution of a polymeric cationic hydroxy aluminum or zirconium complex or a mixture of such complexes, the resulting pillared clay product is separated from the reaction mixture, calcined at a temperature in the range of from about 200° C. to about 700°C. and then cooled, the improvement whereby the stability of said pillared clay product at high temperatures and in the presence of steam is increased comprising the steps of:

reacting said pillared clay product with a stability increasing compound selected from the group consisting of silicon, titanium, phosphorus and antimony halides and ethyl silicates at a temperature in the range of from about 23° C. to about 500° C.; and calcining the resulting reaction product at a temperature in the range of from about 300° C. to about 800° C.

2. The process of claim 1 wherein said smectite clay is montmorillonite.

3. The process of claim 2 wherein said aqueous solution of polymeric cationic hydroxy aluminum or zirconium complex is an aqueous aluminum chlorhydroxide solution.

4. The process of claim 3 wherein said stability increasing compound is silicon tetrachloride.

5. The process of claim 1 wherein the step of reacting said pillared clay product with a stability increasing compound comprises:

contacting said pillared clay product with said stability increasing compound at a temperature in the range of from about 23° C. to about 500° C. whereby said compound is adsorbed on said clay product to substantial saturation; and then heating said clay product to a temperature in the range of from about 300° C. to about 500° C. while continuing to contact said clay product with said stability increasing compound.

6. The process of claim 5 which is further characterized to include the steps of:

cooling said calcined reaction product;
washing said cooled product with water; and
drying said product.

7. A process of preparing a pillared interlayered clay product having increased stability at high temperatures and in the presence of steam comprising the steps of:

reacting a smectite clay with an aqueous solution of a polymeric cationic hydroxy aluminum or zirconium complex;

seperating the resulting pillared clay product from the reaction mixture;

calcining said pillared clay product at a temperature in the range of from about 300° C. to about 800° C.;

cooling said calcined pillared clay product to a temperature in the range of from about 23° C. to about 500° C.;

contacting said cooled pillared clay product with a stability increasing compound selected from the group consisting of silicon, titanium, phosphorus and antimony halides and ethyl silicates whereby said stability increasing compound is adsorbed on said pillared clay product to substantial saturation;

heating said pillared clay product to a temperature in the range of from about 300° C. to about 500° C. while continuing to contact said product with said stability increasing compound; and calcining the resulting reaction pillared clay product at a temperature in the range of from about 300° C. to about 800° C.

8. The process of claim 7 wherein said smectite clay is montmorillonite.

9. The process of claim 8 wherein said aqueous solution of polymeric cationic hydroxy aluminum or zirconium complex is an aluminum chlorhydroxide solution.

10. The process of claim 9 wherein said stability increasing compound is silicon tetrachloride.

11. The process of claim 10 which is further characterized to include the steps of:

cooling said calcined pillared clay product;
washing the resultant cooled product with water; and
drying said product.

12. A pillared interlayered smectite clay composition prepared in accordance with the process of claim 7.

13. The composition of claim 12 wherein said smectite clay is montmorillonite.

14. The composition of claim 13 wherein said aqueous solution of polymeric cationic hydroxy aluminum or zirconium complex is an aluminum chlorhydroxide solution.

15. The composition of claim 14 wherein said stability increasing compound is silicon tetrachloride.

16. The composition of claim 15 wherein said process is further characterized to include the steps of:

cooling said reaction pillared clay product;
washing said cooled product with water; and
drying said product.

* * * * *